(12) United States Patent
Purdey

(10) Patent No.: US 12,491,591 B2
(45) Date of Patent: Dec. 9, 2025

(54) TWO-PART VALVUE MEMBER ASSEMBLY

(71) Applicant: Cummins Ltd., London (GB)

(72) Inventor: Matthew J. Purdey, Huddersfield (GB)

(73) Assignee: Cummins Ltd., London (GB)

( * ) Notice: Subject to any disclaimer, the term of this patent is extended or adjusted under 35 U.S.C. 154(b) by 1186 days.

(21) Appl. No.: 17/413,117

(22) PCT Filed: Dec. 13, 2019

(86) PCT No.: PCT/GB2019/053545
§ 371 (c)(1),
(2) Date: Jun. 11, 2021

(87) PCT Pub. No.: WO2020/120988
PCT Pub. Date: Jun. 18, 2020

(65) Prior Publication Data
US 2022/0040804 A1   Feb. 10, 2022

(30) Foreign Application Priority Data
Dec. 14, 2018 (GB) .................................... 1820434

(51) Int. Cl.
*B23P 15/00* (2006.01)
*F01D 1/06* (2006.01)
(Continued)

(52) U.S. Cl.
CPC .............. *B23P 15/001* (2013.01); *F01D 1/06* (2013.01); *F01D 17/105* (2013.01);
(Continued)

(58) Field of Classification Search
CPC ...... F02B 37/18; F02B 37/183; F02B 37/186; F05D 2220/40; F05D 2230/10;
(Continued)

(56) References Cited

U.S. PATENT DOCUMENTS 5,129,372 A * 7/1992 Seiberth ................... F01L 1/25
123/90.55
2012/0292547 A1  11/2012 Kierat
(Continued)

FOREIGN PATENT DOCUMENTS

CN        103147803 A     6/2013
CN        106662006 A     5/2017
(Continued)

OTHER PUBLICATIONS

UK Search Report for UK Patent Application No. GB1820434.7, mailed Jun. 4, 2019.
(Continued)

*Primary Examiner* — Atif H Chaudry
(74) *Attorney, Agent, or Firm* — Faegre Drinker Biddle & Reath LLP

(57) ABSTRACT

A two-part wastegate valve member assembly comprises a support member and a valve member. The support member defines an aperture. The valve member comprises a central portion extending through the aperture and two opposed end portions disposed on opposite sides of the aperture. Each of the two end portions has dimensions such that the valve member is held captive by the support member. The central portion and two opposed end portions of the valve member are integrally formed. A method for forming the two-part wastegate valve member assembly comprises casting a single manufacturing intermediate and subsequently processing the manufacturing intermediate so as to form the two-part assembly.

16 Claims, 12 Drawing Sheets

(51) Int. Cl.
  *F01D 17/10* (2006.01)
  *F02B 37/18* (2006.01)
  *F02C 6/12* (2006.01)
  *F02C 9/18* (2006.01)

(52) U.S. Cl.
  CPC .............. *F02B 37/186* (2013.01); *F02C 6/12* (2013.01); *F02C 9/18* (2013.01); *F05D 2220/40* (2013.01); *F05D 2230/10* (2013.01); *F05D 2230/211* (2013.01); *F05D 2260/606* (2013.01)

(58) Field of Classification Search
  CPC ......... F05D 2230/211; F05D 2260/606; F05D 2230/21; F01D 17/105; F02C 6/12; F02C 9/18; B23P 15/001
  See application file for complete search history.

(56) References Cited

U.S. PATENT DOCUMENTS

| | | |
|---|---|---|
| 2013/0149126 A1 | 6/2013 | Herrera et al. |
| 2017/0145908 A1 | 5/2017 | Uneura et al. |
| 2018/0230848 A1 | 8/2018 | Iwata et al. |
| 2021/0054779 A1* | 2/2021 | Purdey .................. F02B 37/183 |

FOREIGN PATENT DOCUMENTS

| | | |
|---|---|---|
| DE | 102010007600 A1 | 8/2011 |
| DE | 112015003981 T5 | 5/2017 |
| DE | 102018103283 A1 | 8/2018 |
| EP | 2557344 A1 | 2/2013 |
| EP | 2602448 A2 | 6/2013 |
| JP | 2012167610 A | 9/2012 |
| KR | 20140025764 * | 3/2014 |
| KR | 20140025764 A | 3/2014 |

OTHER PUBLICATIONS

International Preliminary Report on Patentability received for PCT Patent Application No. PCT/GB2019/053545, mailed on Jun. 24, 2021, 10 pages.

International Search Report and Written Opinion, issued by the European Patent Office, dated Apr. 28, 2020 for International Application No. PCT/GB2019/053545; 13 pages.

* cited by examiner

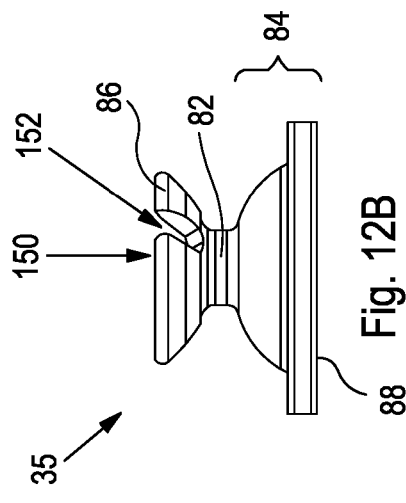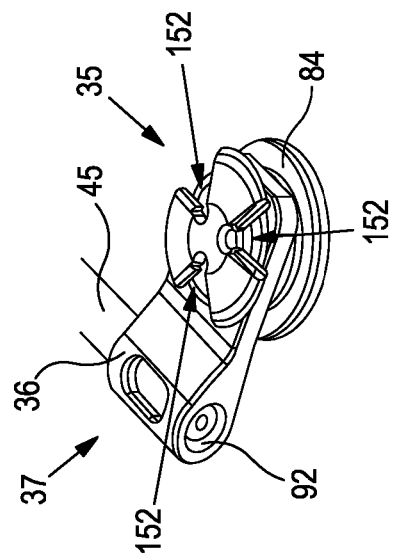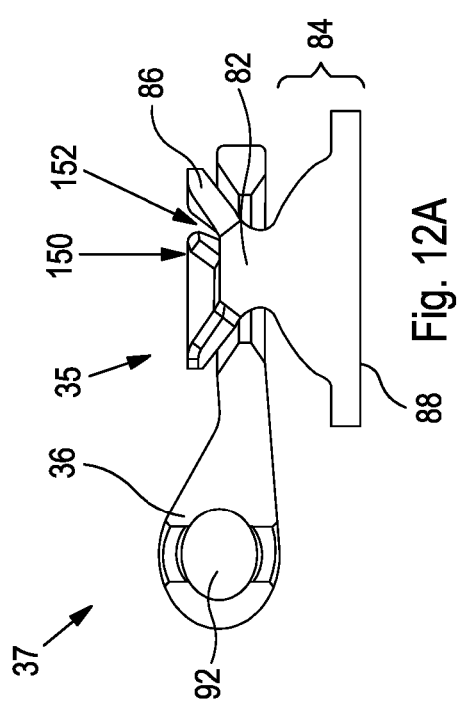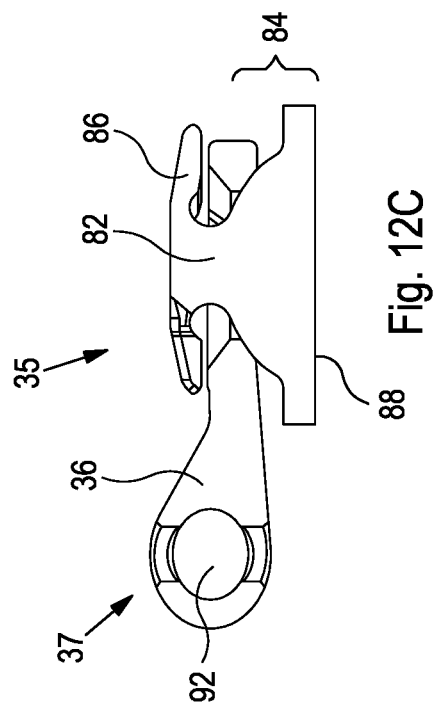

TWO-PART VALVUE MEMBER ASSEMBLY

RELATED APPLICATIONS

The present application claims priority to and is a national phase filing of PCT/GB2019/053545, filed Dec. 13, 2019, which claims priority to UK Application No. 1820434.7, filed on Dec. 14, 2018, the entire disclosures of which being hereby expressly incorporated herein by reference.

FIELD OF THE DISCLOSURE

The present disclosure relates to a two-part valve member assembly and an associated method of manufacturing the two-part valve assembly. In particular, the two-part valve member assembly may form part of a wastegate provided on a turbine. The turbine may form part of a turbocharger or power turbine.

BACKGROUND

Turbomachines are machines that transfer energy between a rotor and a fluid. For example, a turbomachine may transfer energy from a fluid to a rotor or may transfer energy from a rotor to a fluid. Two examples of turbomachines are a power turbine, which uses the rotational energy of the rotor to do useful work, for example, generating electrical power; and a turbocharger, hich uses the rotational energy of the rotor to compress a fluid.

Turbochargers are well known devices for supplying air to an inlet of an internal combustion engine at pressures above atmospheric pressure (boost pressures). A conventional turbocharger comprises an exhaust gas driven turbine wheel mounted on a rotatable shaft within a turbine housing connected downstream of an engine outlet manifold. Rotation of the turbine wheel rotates a compressor wheel mounted on the other end of the shaft within a compressor housing. The compressor wheel delivers compressed air to an engine inlet manifold. The turbocharger shaft is conventionally supported by journal and thrust bearings, including appropriate lubricating systems, located within a central bearing housing connected between the turbine and compressor wheel housings.

The turbine of a conventional turbocharger comprises: a turbine chamber within which the turbine wheel is mounted; an annular inlet defined between facing radial walls arranged around the turbine chamber; an inlet volute arranged around the annular inlet; and an outlet passageway extending from the turbine chamber. The passageways and chamber communicate such that pressurised exhaust gas admitted to the inlet volute flows through the inlet to the outlet passageway via the turbine and rotates the turbine wheel. It is also known to improve turbine performance by providing vanes, referred to as nozzle vanes, in the inlet so as to deflect gas flowing through the inlet. That is, gas flowing through the annular inlet flows through inlet passages (defined between adjacent vanes) which induce swirl in the gas flow, turning the flow direction towards the direction of rotation of the turbine wheel. Turbines may be of a fixed or variable geometry type. Variable geometry turbines differ from fixed geometry turbines in that characteristics of the inlet (such as a size of the inlet) can be varied to optimise gas flow velocities over a range of mass flow rates so that the power output of the turbine can be varied to suit varying engine demands.

It is known to provide a turbocharger turbine with a valve controlled bypass port, commonly referred to as a wastegate. The wastegate enables control of the turbocharger boost pressure and/or shaft speed. The wastegate includes a wastegate passage which extends between an inlet and an outlet of the turbine, bypassing the turbine wheel. The wastegate arrangement also includes a wastegate valve comprising a movable valve assembly and a valve seat. The wastegate is controlled to open the wastegate port (bypass port) when the boost pressure of the fluid in the compressor outlet increases towards a pre-determined level, thus allowing at least some of the exhaust gas to bypass the turbine wheel. Typically the wastegate port opens into a wastegate passage which diverts the bypass gas flow to the turbine outlet or vents it to atmosphere.

The wastegate valve assembly typically comprises a valve member attached to support member, which may be of the form of a lever. The valve member can be moved between a closed position (wherein it cooperates with the valve seat to seal the wastegate passage) and an open position (wherein it is separated from the valve seat) by rotation of the lever. Typically, the valve member is not rigidly attached to the lever. Rather the valve member is typically connected to the lever such that it is free to rotate relative to the lever. The valve member and the lever may be considered to be a two-part wastegate valve member assembly.

SUMMARY

It is an object of the present disclosure to provide two-part valve assembly which at least partially addresses one or more problems present in the prior art, whether identifed herein or otherwise.

According to a first aspect of the present disclosure there is provided a method for forming a two-part wastegate valve member assembly, the method comprising: casting a single manufacturing intermediate; processing the manufacturing intermediate so as to form a two-part assembly, the two-part assembly comprising a support member and a valve member, wherein the support member defines an aperture and wherein the valve member comprises a central portion extending through the aperture and two opposed end portions disposed on opposite sides of the aperture each of the two end portions having dimensions such that the valve member is held captive by the support member.

The method according to the first aspect of the disclosure is advantageous over prior art arrangements, as now discussed.

The support member provides a connection between an actuation mechanism (optionally via a mechanical linkage) and the valve member. In particular, the support member can be used to transmit a force to the valve member such that the valve member contacts a valve seat. Since the valve member assembly is of two-part form, the valve member is free to move relative to the support member. In particular, the valve member can rotate about an axis that is generally aligned with the central portion of the valve member. This is beneficial since it allows each part of the valve member that, in use, contacts the valve seat to contact the valve seat in a range of different positions. This allows the valve member to wear more evenly during use, which can extend the time period over which the wastegate can form a good seal.

Although formed as a two part assembly (with the valve member held captive by the support member), each of the two parts of the two-part valve member assembly is formed from a single integral piece. In particular, the valve member is formed as a single piece with the central portion and two opposed end portions of the valve member being integrally formed. This is in contrast to prior art arrangements wherein, typically, the valve member would be formed from a plurality of assembled parts. For example, prior art valve members (which have an analogous role to the valve member of the first aspect of the disclosure) are typically formed from the following separate components: a part that contacts a valve seat (which is equivalent to a first end portion of the valve member); a valve pin (that extends through the aperture and is equivalent to the central portion of the valve member); one or more spacers; and a washer (which is equivalent to a second end portion of the valve member). Assembly of these parts is required followed by a joining process which may involve, for example, riveting or welding to form the valve member.

In contrast to such prior art arrangements, the valve member as formed by the method according to the first aspect of the disclosure is formed from a single unitary piece that is integrally formed. Advantageously, this removes the need for an assembly step. In addition, the process of casting the single manufacturing intermediate (which may, for example, use investment casting) can be more accurate than the assembly of component parts such that the valve member can better meet desired tolerances. Furthermore, the single unitary valve member is more durable and less prone to mechanical failure. In addition, the unitary valve member can be shaped such that mechanical stresses in the valve member can be decreased. Better durability is especially beneficial in light of the harsh conditions that the valve member assembly will typically experience during use (extreme operating temperatures and pressures that can vary extensively under a range of working and non-working conditions), when the two-part valve assembly forms part of a turbocharger.

The casting of the single manufacturing intermediate may be achieved using investment casting.

The casting the single manufacturing intermediate may involve: forming first and second temporary patterns, each of the first and second temporary patterns corresponding to a different portion of the manufacturing intermediate, wherein the first temporary pattern comprises a portion that corresponds to a portion of the manufacturing intermediate from which part of the valve member will be formed and the second temporary pattern comprises a portion that corresponds to a portion of the manufacturing intermediate from which a second part of the valve member will be formed; joining the temporary patterns together to form an assembled pattern cluster; applying investment materials to the assembled pattern cluster to form an investment mould; and casting the single manufacturing intermediate in the investment mould.

Processing the manufacturing intermediate so as to form a two-part assembly may comprise using a cutting mechanism for removing material from the manufacturing intermediate while moving the manufacturing intermediate relative to the cutting mechanism. The cutting mechanism may be referred to as a cutter.

It will be appreciated that the cutting mechanism can use any suitable form of subtractive manufacturing process. The cutting mechanism may cut generally linearly into the manufacturing intermediate. For example, the cutting mechanism may comprise a cutting tool that can be moved in a cutting direction into the manufacturing intermediate or, alternatively, the cutting mechanism may comprise a laser beam or water jet. Alternatively, the cutting mechanism may comprise a rotary cutter comprising, for example, a rotary cutting tool.

It will be appreciated that moving the manufacturing intermediate relative to the cutting mechanism may be achieved by either: moving the manufacturing intermediate while the cutting mechanism is stationary; moving the cutting mechanism while the manufacturing intermediate is stationary; or moving both the manufacturing intermediate and the cutting mechanism.

Using a cutting mechanism for removing material from the manufacturing intermediate while moving the manufacturing intermediate relative to the cutting mechanism may comprise rotating the single manufacturing intermediate about an axis while the cutting mechanism cuts generally linearly into the manufacturing intermediate.

The cutter may cut into the manufacturing intermediate in a direction that is generally perpendicular to the axis. Alternatively, the cutter may cut into the manufacturing intermediate in a direction that is inclined at an oblique angle relative to the axis.

After the manufacturing intermediate has been processed to form the two-part wastegate valve member assembly, the valve member may be deformed so as to reduce the extent of the movement of the valve member that is possible relative to the support member.

The deformation may be achieved, for example, using a hydraulic press.

During the casting and/or processing of the single manufacturing intermediate, the valve member may be provided with one or more features to aid the deformation of the valve member. Such features may include one or more features provided on a surface of the valve member, for example a depression, to aid the deformation of the valve member. Additionally or alternatively, such features may include one or more voids or absences of the material from which the valve member is formed.

The method may further comprise vibration of the two-part valve assembly to deburr the two-part wastegate valve member assembly.

Such vibration may be used to improve the surface finish of an interface between a first end portion of the valve member and the support member.

Complementary curved surfaces may be formed: on a first end portion of the valve member; and a portion of the support member surrounding the aperture which is arranged to contact the first end portion.

For example, the first end portion of the valve member may be provided with a generally convex surface (which may, for example, be generally spherical). In addition, a portion of the support member surrounding the aperture which is arranged to contact the first end portion may be provided with a generally concave surface (which may, for example, be generally spherical). These two complementary surfaces provide a centring effect for the valve member. Advantageously, this can increase the sealing ability of the wastegate valve.

In addition, as a result of this centring effect, a radial clearance between the central portion of the valve member and the aperture in the support member can be increased relative to prior art arrangements. Advantageously, this provides a larger radial gap in which investment materials can be received. In addition, this increased radial clearance provides an increased volume for a cutting tool to break through into. For these reasons the combination of the provision of the pair of generally complementary curved surfaces (on the first end portion and a portion of the support member which is arranged to contact the first end portion) may be considered to have a synergistic effect in combination with the method according to the first aspect of the disclosure.

According to a second aspect of the present disclosure there is provided a two-part wastegate valve member assembly comprising: a support member which defines an aperture; and a valve member, wherein the valve member comprises a central portion extending through the aperture and two opposed end portions disposed on opposite sides of the aperture each of the two end portions having dimensions such that the valve member is held captive by the support member; wherein the central portion and two opposed end portions of the valve member are integrally formed.

It will be appreciated that integrally formed is intended to mean formed from a single piece. For example a piece that was formed from a single casting process (whether or not subsequently machined). Equivalently, that an object is integrally formed is intended to mean that the object is not formed from component parts that are first formed and then subsequently assembled.

The two-part wastegate valve member assembly according to the second aspect of the disclosure may, for example, be formed using the method according to the first aspect of the disclosure. Where appropriate, the two-part wastegate valve member assembly according to the second aspect of the disclosure may comprise features which correspond to any of the features of the method according to the first aspect of the disclosure.

The two-part wastegate valve member assembly is beneficial, as discussed above, since it allows the valve member to rotate relative to the support member, allowing the valve member to wear more evenly during use. However, although formed as a two part assembly (with the valve member held captive by the support member), each of the two parts of the two-part valve member assembly is formed from a single integral piece. In particular, the valve member is formed as a single piece with the central portion and two opposed end portions of the valve member being integrally formed.

This is in contrast to prior art arrangements wherein, typically, the valve member is formed from a plurality of assembled parts. For example, prior art valve members (which have an analogous role to valve member) are typically formed from the following separate components: a part that contacts a valve seat (which is equivalent to a first end portion of the valve member); a valve pin (that extends through aperture and is equivalent to the central portion of the valve member); one or more spacers; and a washer (which is equivalent to a second end portion of the valve member). Assembly of these parts is required followed by a joining process which may involve, for example, riveting or welding to form the valve member.

In contrast to such prior art arrangements, the valve member is formed from a single unitary piece that is integrally formed. Advantageously, this removes the need for an assembly step. In addition, the investment casting process can be more accurate than the assembly of component parts such that the valve member can better meet desired tolerances. Furthermore, the single unitary valve member is more durable and less prone to mechanical failure. In addition, the unitary valve member can be shaped such that mechanical stresses in the valve member can be decreased. Better durability is especially beneficial in light of the harsh conditions that the valve member assembly will typically experience during use (extreme operating temperatures and pressures that can vary extensively under a range of working and non-working conditions), when the two-part valve assembly forms part of a turbocharger.

A first end portion of the valve member and a portion of the support member surrounding the aperture which is arranged to contact the first end portion may be provided with complementary curved surfaces.

For example, the first end portion of the valve member may be provided with a generally convex surface (which may, for example, be generally spherical). In addition, a portion of the support member surrounding the aperture which is arranged to contact the first end portion may be provided with a generally concave surface (which may, for example, be generally spherical). These two complementary surfaces provide a centring effect for the valve member. Advantageously, this can increase the sealing ability of the wastegate valve.

A second end portion of the valve member may be provided with one or more voids or absences of the material from which the valve member is formed. For example, the second end portion of the valve member may be generally of the form of a disc and the one or more voids or absences of the material from which the valve member is formed may be generally of the form of recesses that extend from a perimeter of the disc towards a centre of the disc. The recesses that extend from the perimeter of the disc towards the centre of the disc may be generally triangular recesses.

According to a third aspect of the disclosure there is provided a turbine comprising: a turbine housing defining a turbine inlet upstream of a turbine wheel and a turbine outlet downstream of the turbine wheel; a wastegate passage connecting the turbine inlet and the turbine outlet; and a wastegate valve comprising the two-part wastegate valve member assembly according to the second aspect of the disclosure, the wastegate valve having an open state in which gas may pass between the turbine inlet and turbine outlet via the wastegate passage and a closed state in which the valve member substantially prevents gas from passing between the turbine inlet and the turbine outlet via the wastegate passage.

According to a fourth aspect of the present disclosure there is provided a turbocharger or powerturbine including a turbine according to the third aspect of the present disclosure.

BRIEF DESCRIPTION OF THE DRAWINGS

A specific embodiment of the present disclosure will now be described, by way of example only, with reference to the accompanying drawings, in which:

FIG. 12A shows a schematic cross sectional view of a third variant of the two-part wastegate valve member assembly shown in FIGS. 6A and 6B in a first configuration;

FIG. 12B shows a valve member that forms part of the two-part wastegate valve member assembly shown in FIG. 12A;

FIG. 12C shows a schematic cross sectional view of the two-part wastegate valve member assembly as shown in FIG. 12A disposed in a second configuration, the valve member having been deformed so as to reduce a clearance between the valve member and the support member; and FIG. 12D is a perspective view of the third variant of the two-part wastegate valve member assembly as shown in FIGS. 12A-12C disposed in the second configuration.

DETAILED DESCRIPTION OF EMBODIMENTS OF THE DISCLOSURE

Figure 1:
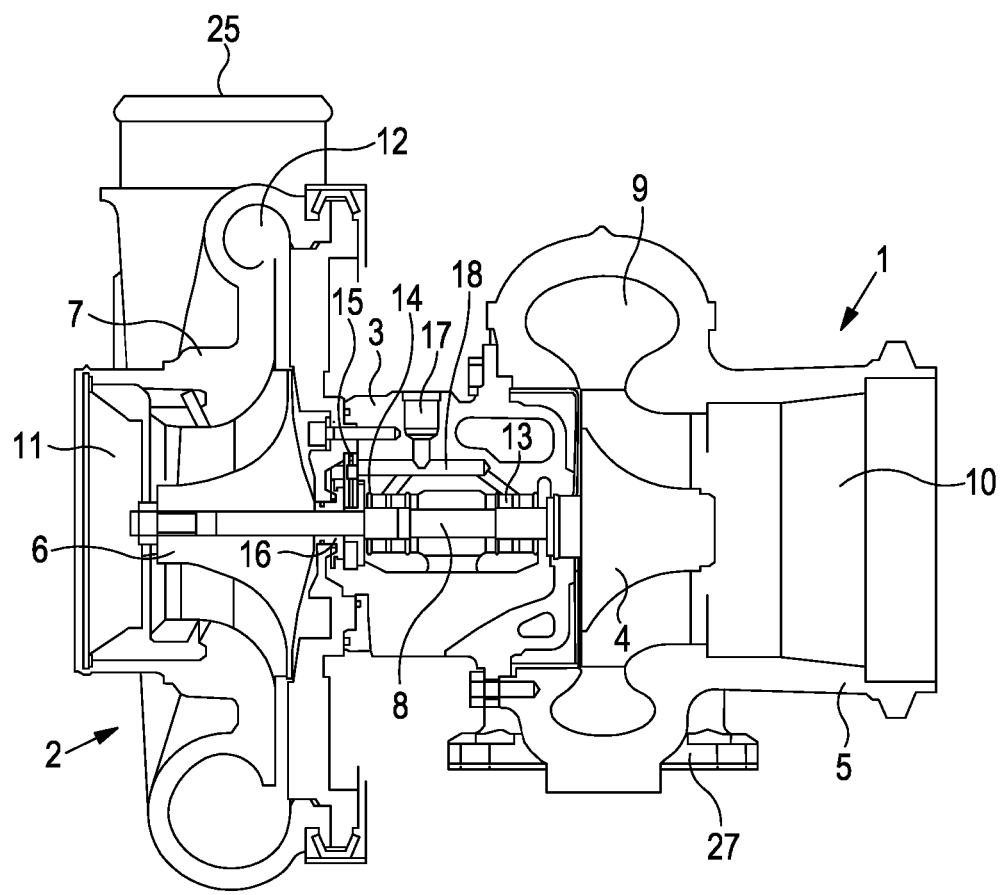
FIG. 1 shows a schematic cross-section through a portion of a first turbocharger that may incorporate a two-part valve member assembly according to an embodiment of the disclosure.

FIG. 1 shows a schematic cross-section of a turbocharger. The turbocharger comprises a turbine 1 joined to a compressor 2 via a central bearing housing 3. The turbine 1 comprises a turbine wheel 4 for rotation within a turbine housing 5. Similarly, the compressor 2 comprises a compressor wheel 6 which can rotate within a compressor housing 7. The compressor housing 7 defines a compressor chamber within which the compressor wheel 6 can rotate. The turbine wheel 4 and compressor wheel 6 are mounted on opposite ends of a common turbocharger shaft 8 which extends through the central bearing housing 3.

The turbine housing 5 has an exhaust gas inlet volute 9 arranged around the turbine wheel 4 and an axial exhaust gas outlet 10. The compressor housing 7 has an axial air intake passage 11 and a volute 12 arranged around the compressor chamber. The volute 12 is in gas flow communication with a compressor outlet 25. The turbocharger shaft 8 rotates on journal bearings 13 and 14 housed towards the turbine end and compressor end respectively of the bearing housing 3.

The compressor end bearing 14 further includes a thrust bearing 15 which interacts with an oil seal assembly including an oil slinger 16. Oil is supplied to the bearing housing from the oil system of the internal combustion engine via oil inlet 17 and is fed to the bearing assemblies by oil passageways 18. The oil fed to the bearing assemblies may be used to both lubricate the bearing assemblies and to remove heat from the bearing assemblies.

In use, the turbine wheel 4 is rotated by the passage of exhaust gas from the exhaust gas inlet 9 to the exhaust gas outlet 10. Exhaust gas is provided to exhaust gas inlet 9 from an exhaust manifold (also referred to as an outlet manifold) of the engine (not shown) to which the turbocharger is attached. The turbine wheel 4 in turn rotates the compressor wheel 6 which thereby draws intake air through the compressor inlet 11 and delivers boost air to an inlet manifold of the engine via the volute 12 and then the outlet 25.

The exhaust gas inlet 9 is defined by a portion of the turbine housing 5 which includes a turbocharger mounting flange 27 at the end of the exhaust gas inlet 9 remote from the turbine wheel 4.

Figure 2:
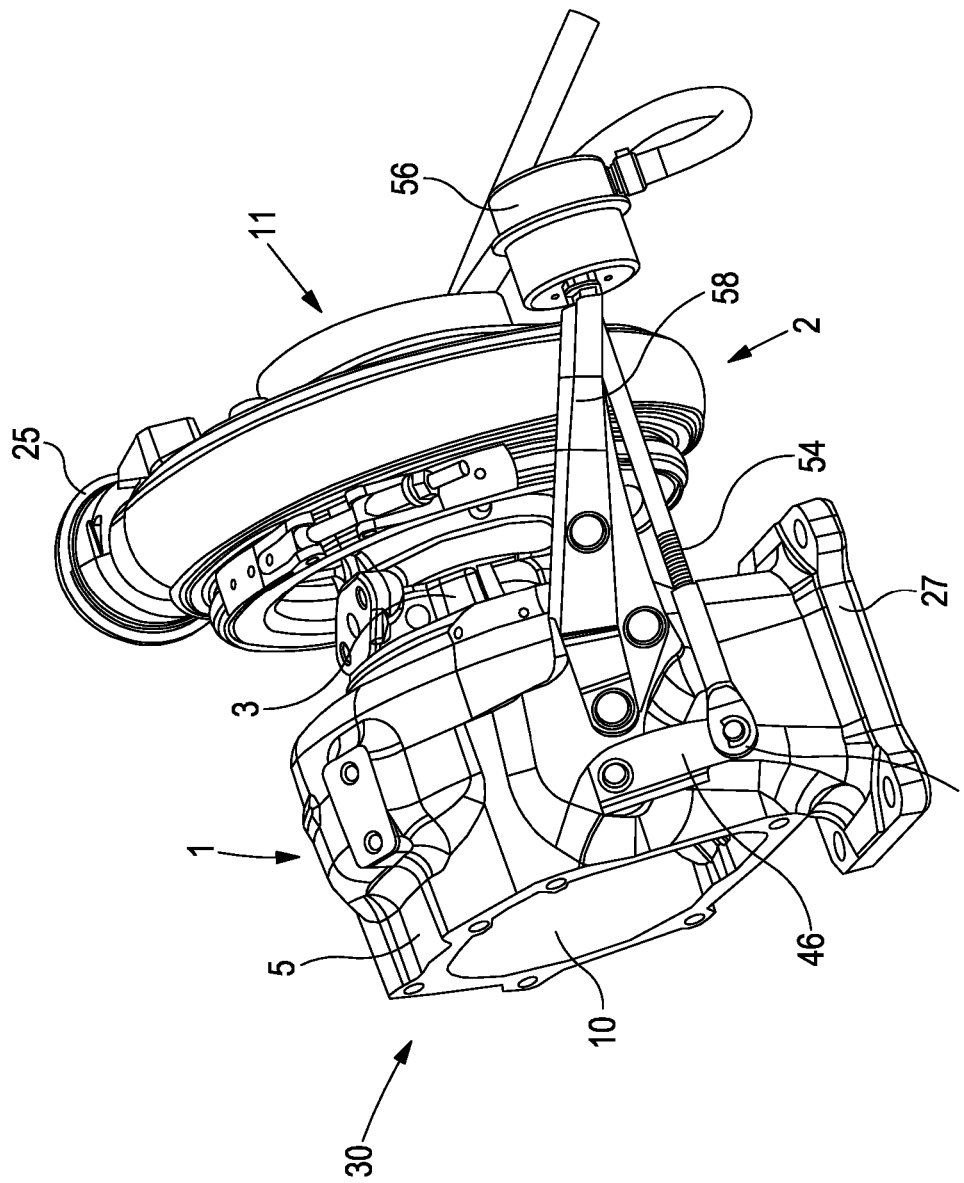
FIG. 2 shows a schematic perspective view of a second turbocharger that incorporates a two-part valve member assembly according to an embodiment of the disclosure.
Figure 3:
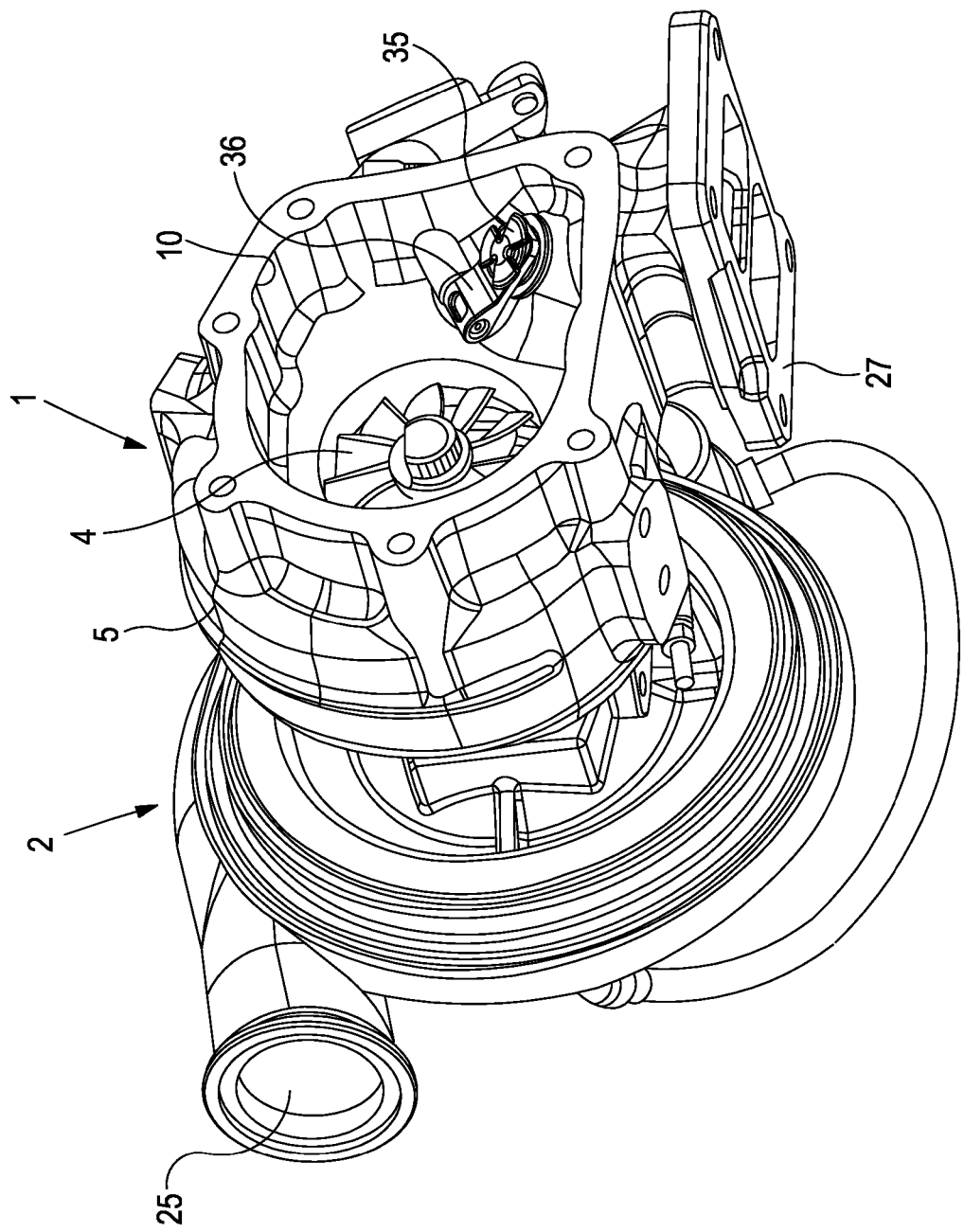
FIG. 3 shows a schematic end-on perspective view of a portion of the turbocharger shown in FIG. 1.
Figure 4:
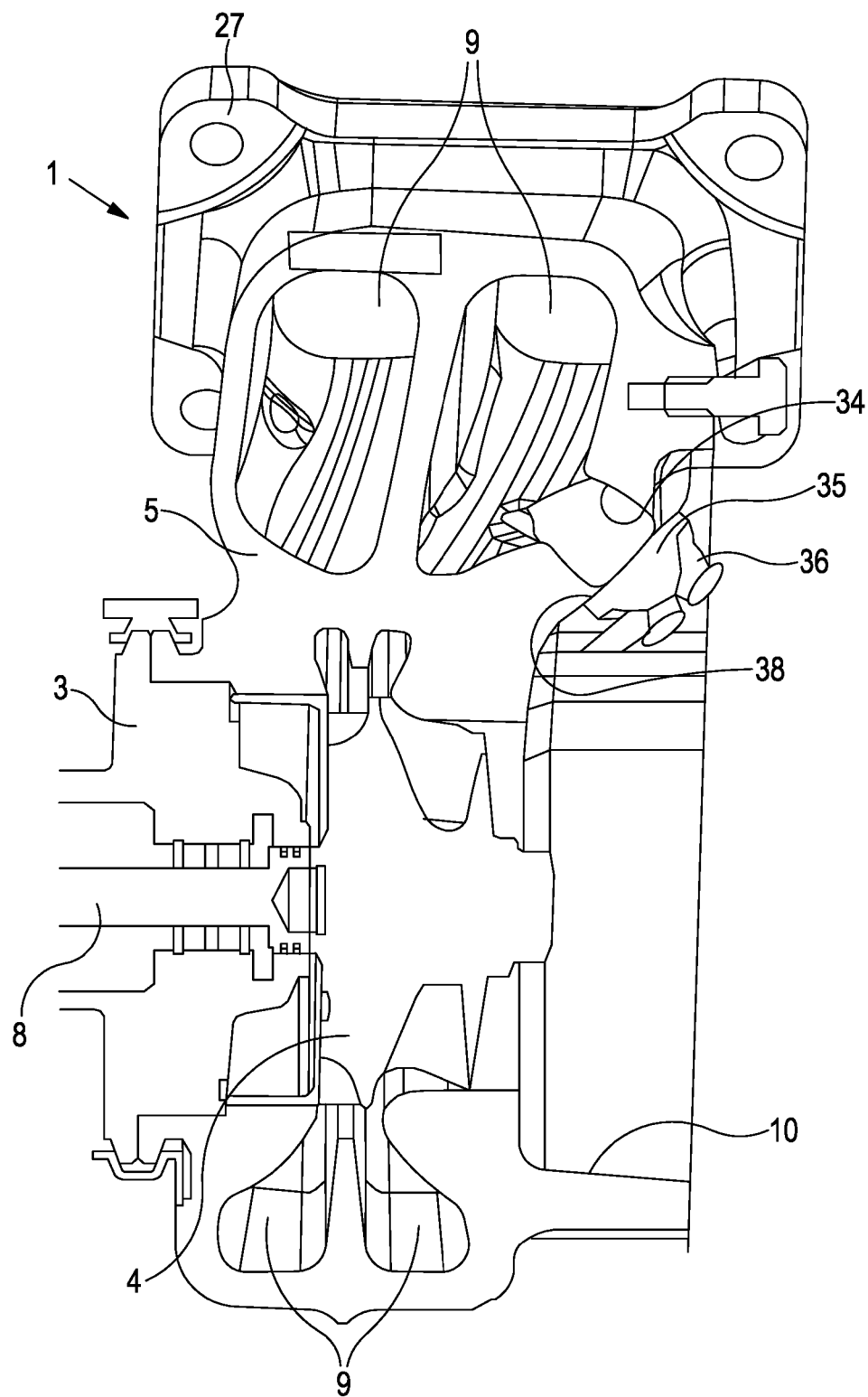
FIG. 4 shows a schematic cross-section through a portion of the turbocharger shown in FIGS. 1 and 2.

FIGS. 2 to 4 show various schematic views of portions of a turbocharger 30 which includes a two-part wastegate valve member assembly 37 in accordance with an embodiment of the present disclosure. The turbocharger 30 includes all of the features of the turbocharger described above in relation to FIG. 1. The same numbering is used within FIGS. 2 to 5B for features of the turbocharger 30 shown in FIGS. 2 to 5B which are equivalent to features shown in the turbocharger 30 of FIG. 1.

In addition to the features shown in FIG. 1, the turbocharger 30 also includes a wastegate assembly. The wastegate arrangement includes a wastegate passage 34 (see FIG. 4). The wastegate passage 34 extends between the turbine inlet 9 and turbine outlet 10, and hence connects the turbine inlet 9 with the turbine outlet 10. The wastegate arrangement also includes a wastegate valve comprising a movable valve member 35 and a valve seat 38. The valve seat 38 is a surface of the turbine housing 5 which is configured to be contactable with a surface of the valve member 35 in order to produce a substantially gas-tight seal between the valve seat 38 and the valve member 35.

The wastegate valve (and hence valve member 35) has an open state (not shown) in which gas may pass between the turbine inlet 9 and turbine outlet 10 via the wastegate passage 34. The wastegate valve (and hence valve member 35) also has a closed state (as shown in FIG. 4) in which the wastegate valve member 35 contacts the valve seat 38 and thereby in which gas is substantially prevented from passing between the turbine inlet 9 and turbine outlet 10 via the wastegate passage 34.

The valve member 35 is connected to an actuation member 39 via a support member 36. The support member 36 defines an aperture. The valve member 35 comprises a central portion extending through the aperture and two opposed end portions disposed on opposite sides of the aperture each of the two end portions having dimensions such that the valve member 35 is held captive by the support member 36. The valve member 35 support member 36 may be considered to form the two-part wastegate valve member assembly 37.

The actuation member 39 passes through an actuator conduit (not shown) of the turbine housing 5. The actuation member 39 is movable so as to move the wastegate valve between the open and closed states and, in particular, so as to move the valve member 35 between corresponding open and closed states.

The actuation member 39 may be moved in any appropriate manner so as to move the valve member 35 of the wastegate valve between the open and closed states. In the embodiment shown in FIGS. 2 to 5B this is achieved as follows. The actuation member 39 includes a generally cylindrical shaft 45 which defines an axis A. A first end of the shaft 45 of the actuation member 39 is connected to the support member 36. A second end of the shaft of the actuation member 39 is connected to a lever arm 46. The actuation member 39 and the lever arm 46 may both be considered to form part of an actuation assembly.

The valve member assembly 37 is mounted to the actuation member 39 such that the valve member assembly 37 is located on a first side of the actuator conduit such that it is disposed within the turbine housing 5. A portion of the actuation member 39 is mechanically linked to a linkage (actuator lever 46 and actuator rod 54) configured to be linked to an actuator. The portion of the actuation member 39 which is mechanically linked to the linkage configured to be linked to the actuator is located on a second side of the actuator conduit such that it is disposed outside of the turbine housing 5.

Figure 5A:
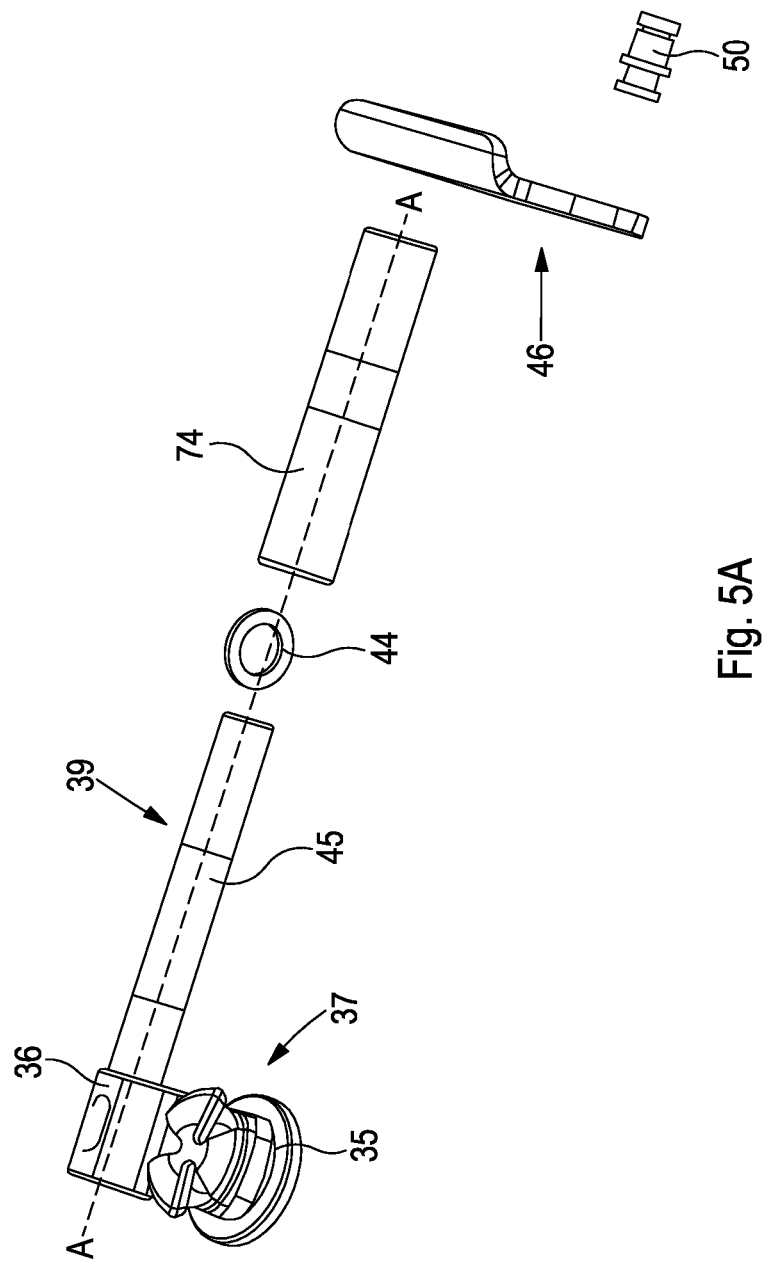
FIG. 5A shows a schematic exploded perspective view of a valve member assembly and an actuation assembly which form part of the turbocharger shown in FIGS. 2 to 4.
Figure 5B:
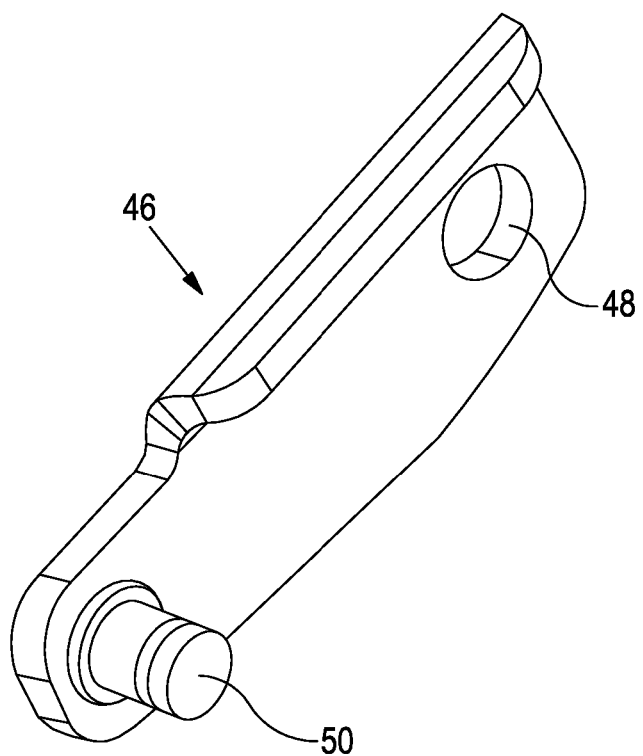
FIG. 5B shows a lever arm and a stub, which together form part of the actuation assembly shown in FIG. 5A.

In FIG. 5A, the lever arm 46 is shown separated from the shaft 45 in order to aid the clarity of the Figure. In the present embodiment, the second end of the shaft 45 of the actuation member is received by a recess 48 of the lever arm 46 (see FIG. 5B). Spaced from the recess 48 along the lever arm 46 is a stub 50. In the embodiment shown in FIGS. 5A and 5B, the stub 50 it will be appreciated that a first end of the stub 50 is received by a second recess (not shown) of the lever arm 46. A second end of the stub 50 is received by a first end 52 of an actuation rod 54. A second end (not shown) of the actuation rod 54 is connected to an actuator 56 which is mounted to the turbine 1 via an actuator mounting arm 58. The shaft 45 of the actuation member is located within the actuator conduit as follows. A bush 74 is received by the actuator conduit of the turbine housing 5. The bush 74 is of the form of a tube (with a generally annular cross section) and the shaft 45 of the actuation member passes through a central bore of the bush 74. The bush 74 supports the shaft 45 such that it can rotate about axis A.

The actuation rod 54 extends generally perpendicularly from the shaft 45 such that the stub 50 is spaced from the axis A. Similarly, the support member 36 extends generally perpendicularly from the shaft 45 such that the valve member 35 is spaced from the axis A.

Since the stub 50 is spaced apart from the axis A, movement of the stub 50 causes the shaft 45 to rotate around the axis A. The rotation of the shaft 45 of the actuation member 39 about the axis results in the wastegate valve member assembly 37 also rotating about axis A. In this way the valve member 35 (which is spaced apart from the axis A) can pivot about axis A between the open state (corresponding to the open state of the wastegate valve) in which the valve member 35 is spaced from the valve seat 38 and the closed state (corresponding to the closed state of the wastegate valve) in which the valve member 35 contacts the valve seat 38.

Movement of the stub 50 is achieved by an actuator via actuator rod 54, which causes the lever arm 46, and hence attached shaft 45 of the actuation member 39, to rotate about axis A. Any appropriate actuator, such as, for example, a pneumatic actuator may be used. The mounting and operation of an actuator (and any associated linkage) in order to move a valve member of a wastegate valve is well-known, and hence further discussion of this is omitted within this description.

Optionally, an annular ring 44 may be disposed on the shaft 45 of the actuation member, sandwiched between the valve member assembly 37 and the bush 74. The annular ring 44 may be referred to as a shim and may act reduce wear as the valve member assembly 37 rotates relative to the bush 74. Additionally or alternatively, the annular ring 44 may perform a seal and may at least partially prevent gas from passing between the turbine outlet 10 and the actuator conduit.

Figure 6A:
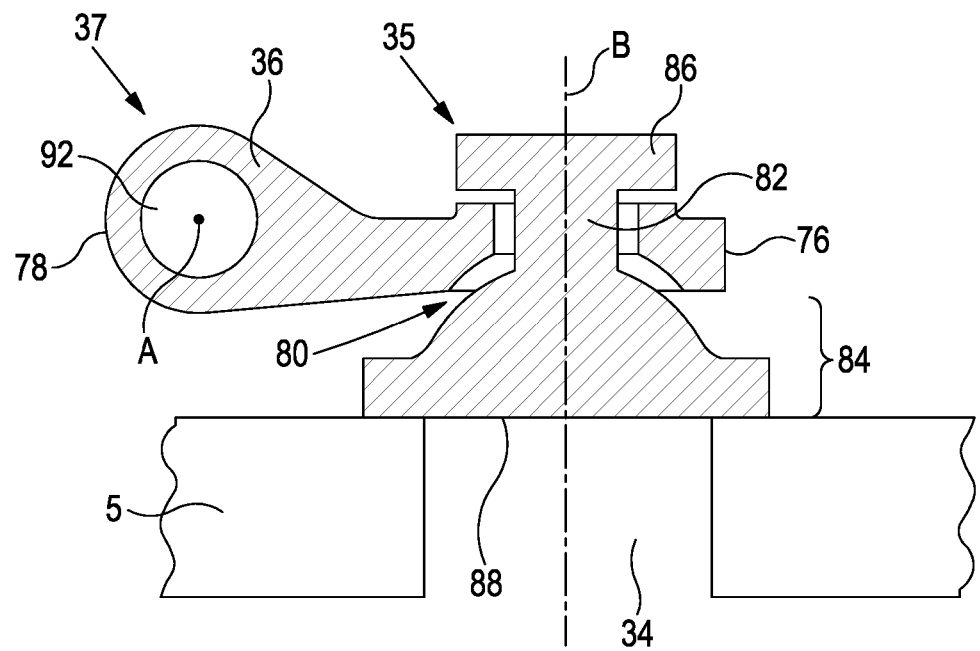
FIG. 6A shows a schematic cross sectional view of a two-part wastegate valve member assembly according to an embodiment of the disclosure disposed in a closed state.
Figure 6B:
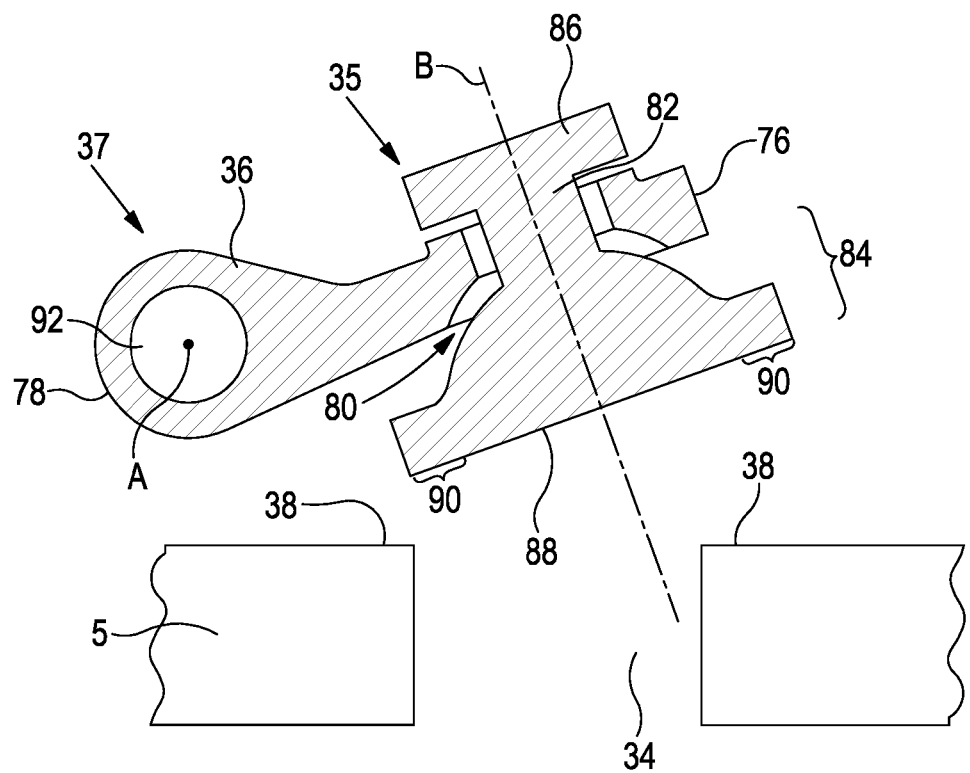
FIG. 6B shows a schematic cross sectional view of the two-part wastegate valve member assembly shown in FIG. 6A disposed in an open state.

FIGS. 6A and 6B show a schematic cross sectional view of the two-part wastegate valve member assembly 37 (comprising the valve member 35 and the support member 36) and valve seat 38. FIG. 6A shows the two-part wastegate valve member assembly 37 in a closed state in which the valve member 35 contacts the valve seat 38 and FIG. 6B shows the two-part wastegate valve member assembly 37 in an open state in which the valve member 35 is spaced from the valve seat 38.

The support member 36 extends generally from a first end 76 to a second end 78. Proximate the first end 76, the support member 36 defines an aperture 80.

The valve member 35 comprises a central portion 82 extending through the aperture 80 and two opposed end portions 84, 86 disposed on opposite sides of the aperture 80. The central portion 82 of the valve member 35 defines an axis B of the valve member 35. Each of the two end portions 84, 86 has dimensions such that the valve member 35 is held captive by the support member 36. That is, the dimensions of the end portions 84, 86 are such that they cannot pass through the aperture 80.

A first of the end portions 84 defines a valve member surface 88. In use, when the valve member assembly 37 is in the closed state, it is a portion of the valve member surface 88 which contacts the valve seat 38. In particular, it is a peripheral portion 90 (see FIG. 6B) of the valve member surface 88 which contacts the valve seat 38 which is formed from a portion of the turbine housing 5 which surrounds the wastegate passage 34.

Proximate the second end 78, the support member 36 defines a second aperture 92. The second aperture 92 is for receipt of the first end of the shaft 45 of the actuation member 39 to facilitate mechanical connection between the support member 36 and the shaft 45. In order to aid the clarity of FIGS. 6A and 6B, the shaft 45 of the actuation member 39 is not shown, however, the axis A of the actuation member 39 is shown in these Figures. The aperture 80 and the second aperture 92 extend through the support member 36 in two substantially perpendicular directions.

As described above, two-part wastegate valve member assembly 37 comprises the valve member 35, which is held captive by the support member 36. The support member 36 provides a connection between the actuation member 39 and the valve member 35. In particular, the support member 36 is arranged to transmit a force to the valve member 35 such that the valve member 35 contacts the valve seat 38 and gas is substantially prevented from passing between the turbine inlet 9 and turbine outlet 10 via the wastegate passage 34 (application of the force being achieved by rotation of the actuation member 39 about axis A). However, the valve member assembly 37 is of two-part form and the valve member 35 is free to move relative to the support member 36. In particular, the valve member 35 can rotate about the axis B that is generally aligned with the central portion 82 of the valve member 35. This is beneficial since it allows each part of the valve member 35 that contacts the valve seat 38 to contact the valve seat 38 in a range of different positions. This allows the valve member 35 to wear more evenly during use, which can extend the time period over which the wastegate can form a good seal.

According to an embodiment of the present disclosure there is provided a method for forming the two-part wastegate valve member assembly 37, as now described. The method comprises forming a single one-piece manufacturing intermediate and then subsequently processing the manufacturing intermediate so as to form the two-part assembly.

Figure 7:
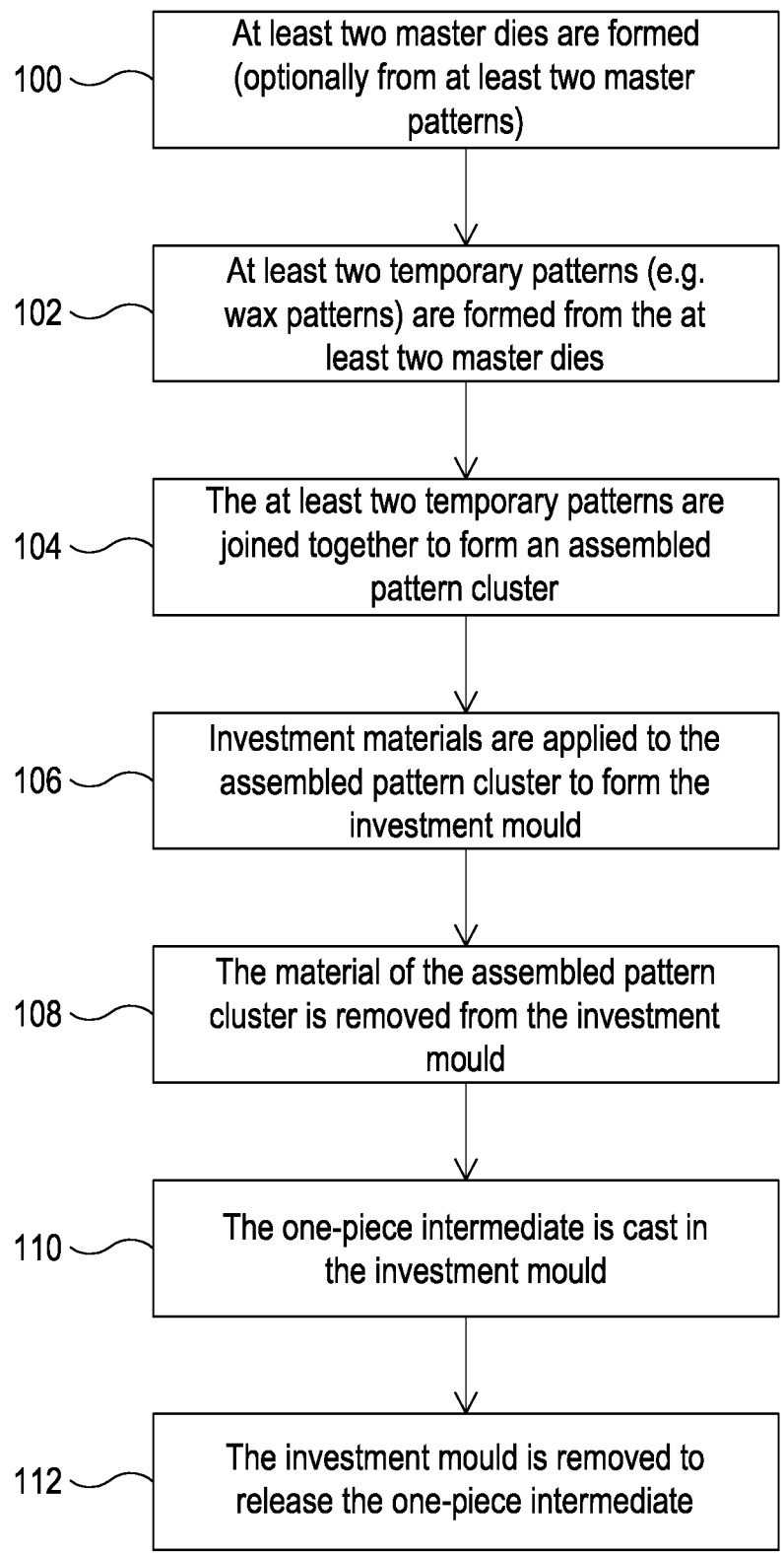
FIG. 7 is a schematic representation of the steps involved in an investment casting process according to an embodiment of the present disclosure for a manufacturing intermediate from which the two-part wastegate valve member assembly shown in FIGS. 6A and 6B is formed.
Figure 8A:
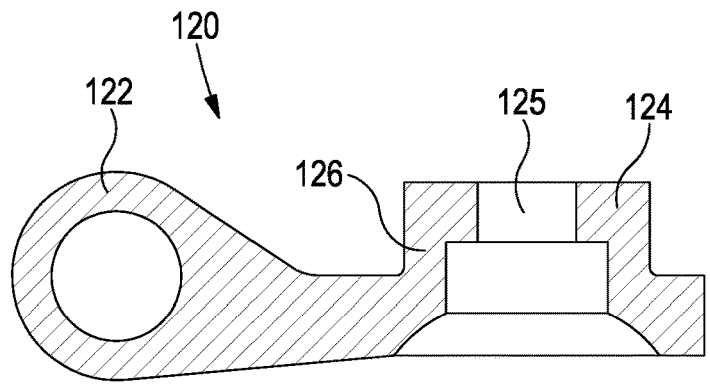
FIG. 8A is a cross sectional view of a first temporary pattern formed as an intermediate in the manufacture of the two-part wastegate valve member assembly as shown in FIGS. 6A and 6B.
Figure 8B:
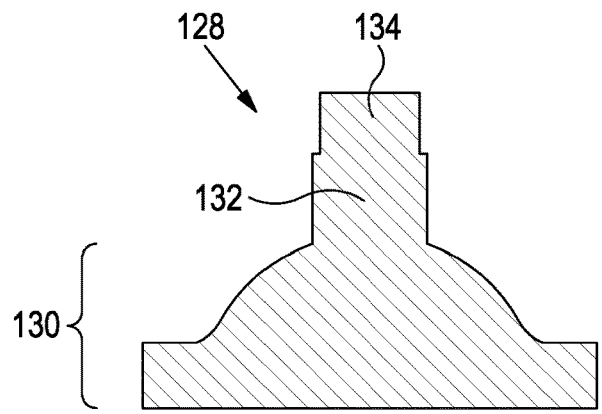
FIG. 8B is a cross sectional view of a second temporary pattern formed as an intermediate in the manufacture of the two-part wastegate valve member assembly as shown in FIGS. 6A and 6B.
Figure 8C:
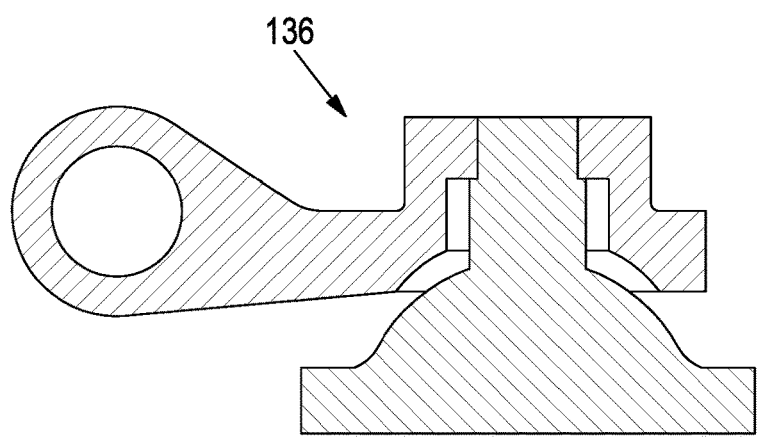
FIG. 8C shows a cross section of an assembled pattern cluster that is formed from the two temporary patterns shown in FIGS. 8A and 8B.

The casting of a single one-piece manufacturing intermediate may be achieved using investment casting, as now described, with reference to FIGS. 7, 8A, 8B and 8C. FIG. 7 is a schematic representation of the steps involved in the investment casting process to form a manufacturing intermediate from which the two-part wastegate valve member assembly 37 is formed. FIGS. 8A and 8B are cross sectional views of two temporary patterns formed as intermediates in the manufacture of the single one-piece manufacturing intermediate and FIG. 8C shows a cross section of an assembled pattern cluster that is formed from these two temporary patterns.

The steps involved in the investment casting process are now discussed with reference to FIG. 7. First, at step 100, two or more master dies or moulds are formed from which two or more portions of the one-piece manufacturing intermediate can be formed. In one embodiment, two master dies are formed from which two separate portions of the one-piece manufacturing intermediate can be formed. The two or more portions of the one-piece manufacturing intermediate are chosen such that the master dies can be reused. That is to say, the master dies are not sacrificed after use. Optionally, two or more master patterns may first be formed such that, when assembled, they form the one-piece manufacturing intermediate. Each master die may be formed from one of these master patterns.

At step 102, at least two temporary patterns are formed from the at least two master dies using a suitable material. The temporary patterns are formed from a material that can be subsequently removed by melting or vaporisation (see step 108 described below). For example, the temporary patterns may be formed from wax. Alternatively, the temporary patterns may be formed from any other convenient material that has an appropriate melting point such as, for example, plastics materials or frozen mercury. The temporary patterns may be formed by melting the material, pouring it into the master dies and allowing it to cool.

The two or more portions of the one-piece manufacturing intermediate are chosen such that the master dies can be reused. That is to say, the temporary patterns can be removed from the master dies without breaking or sacrificing the master dies. In one embodiment, two master dies are used to form two separate temporary patterns 120, 128, as shown in FIGS. 8A and 8B.

The first temporary pattern 120 comprises a first portion 122, a second portion 124, and a third portion 126. The first portion 122 of the first temporary pattern 120 corresponds to a portion of the manufacturing intermediate from which the support member 36 will be formed. The second portion 124 of the first temporary pattern 120 corresponds to a portion of the manufacturing intermediate from which part of a second end portion 86 of the valve member 35 will be formed. The third portion 126 of the first temporary pattern 120 connects the first portion 122 to the second portion 124. The third portion 126 of the first temporary pattern 120 corresponds to a portion of the manufacturing intermediate that will be removed by processing (for example by machining) to form the two-part wastegate valve member assembly 37 from the one-piece manufacturing intermediate, as described further below.

The second temporary pattern 128 comprises a first portion 130, a second portion 132, and a third portion 134. The first portion 130 of the second temporary pattern 128 corresponds to a portion of the manufacturing intermediate from which the first of the end portion 84 of the valve member 35 will be formed. The second portion 132 of the second temporary pattern 128 corresponds to a portion of the manufacturing intermediate from which the central portion 82 of the valve member 35 will be formed. The third portion 134 of the second temporary pattern 128 corresponds to a portion of the manufacturing intermediate from which part of a second end portion 86 of the valve member 35 will be formed (along with the second portion 124 of the first temporary pattern 120).

Referring again to FIG. 7, at step 104, the temporary patterns are joined together to form an assembled pattern cluster. This may be achieved by heating surfaces of two temporary patterns (which may, for example, be formed from wax) and then pressing the two temporary patterns together and allowing them to cool. FIG. 8C shows an assembled pattern cluster 136 that is formed from the two temporary patterns 120, 128 shown in FIGS. 8A and 8B. To assemble the temporary patterns 120, 128, the third portion 134 of the second temporary pattern 128 is received in a bore 125 in the second portion 124 of the first temporary pattern 120. An inner surface of the bore 125 and an outer surface of the third portion 134 of the second temporary pattern 128 are heated to partially melt the material from which the temporary patterns 120, 128 are formed. Whilst still partially melted, the third portion 134 of the second temporary pattern 128 is inserted in the bore 125 in the second portion 124 of the first temporary pattern 120 and the two temporary patterns 120, 128 are pressed together while they are allowed to cool.

Next, at step 106, investment materials are applied to the assembled pattern cluster 134 to form the investment mould. As is known in the field of investment casting, the forming of the investment mould may include the steps of coating, stuccoing and hardening.

The coating step may involve dipping the pattern cluster 136 in a slurry containing fine particles mixed with a liquid such that the pattern cluster is coated in the fine particles. It will be appreciated that the fineness of the particles may be dependent on the resolution with which it is desired to reproduce the shape of the pattern cluster 136. The stuccoing step may involve coarser particles, for example by dipping the pattern cluster 136 in a fluidized bed. The hardening process involves drying and/or heating the materials in order to cure them.

The steps of coating, stuccoing and hardening may be repeated a plurality of times until a desired thickness of the investment material has been reached.

Once the investment mould has fully dried and hardened, at step 108 the material (for example wax) of the assembled pattern cluster 136 is removed from the investment mould. This may be achieved by heating the assembled pattern cluster 136 above its melting point and allowing the material to flow out of the investment mould through one or more apertures therein.

Next, at step 110 the one-piece manufacturing intermediate is cast in the investment mould by pouring the material, for example molten metal, into the investment mould and allowing it to cool. While the one-piece manufacturing intermediate is being cast, the investment mould may be supported in a container of sand or the like.

Finally, at step 112 the investment mould is removed to release the one-piece intermediate. The investment mould may be mechanically or otherwise broken to allow the one-piece intermediate to be removed.

The processing of the single one-piece manufacturing intermediate so as to form the two-part assembly may involve any suitable machining process to separate the manufacturing intermediate into two parts. In one embodiment, the processing of the single one-piece manufacturing intermediate so as to form the two-part assembly involves a turning process, as now described with reference to FIGS. 9A, 9B and 9C.

Figure 9A:
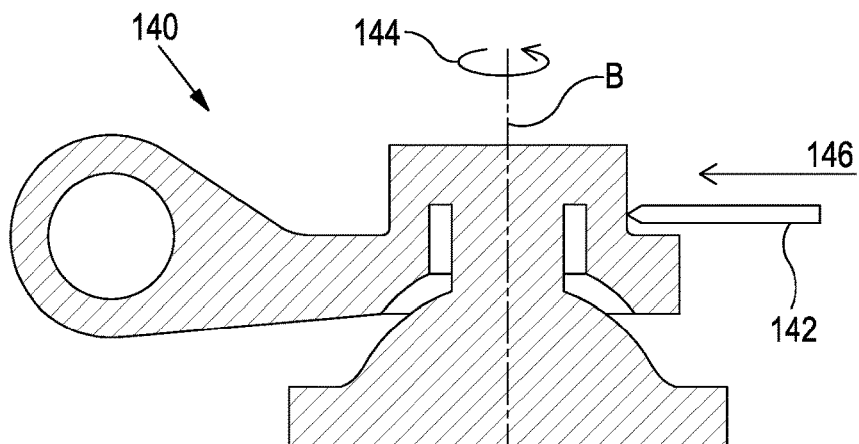
FIG. 9A shows a one-piece manufacturing intermediate and a cutting tool before the cutting tool has contacted the one-piece manufacturing intermediate.

FIG. 9A shows a one-piece manufacturing intermediate 140 that has been cast using the method described above with reference to FIGS. 7 to 8C and a cutting tool 142. The one-piece manufacturing intermediate 140 is rotated about axis B, as indicated by arrow 144. For example, the one-piece manufacturing intermediate 140 may be mounted on a lathe or the like. As the manufacturing intermediate 140 is rotated about axis B, the cutting tool 142 is moved linearly into contact with the manufacturing intermediate 140, as indicated by arrow 146.

Figure 9B:
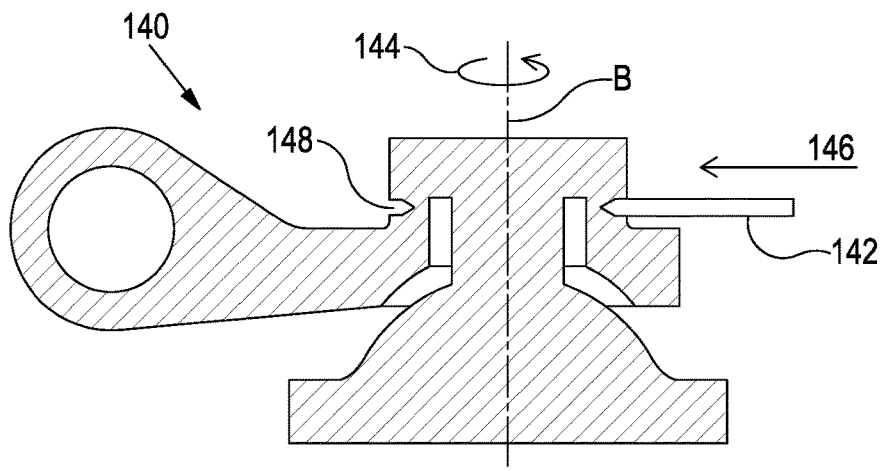
FIG. 9B shows the one-piece manufacturing intermediate and cutting tool shown in FIG. 9A, with the cutting tool having contacted and partially cut into, the one-piece manufacturing intermediate.
Figure 9C:
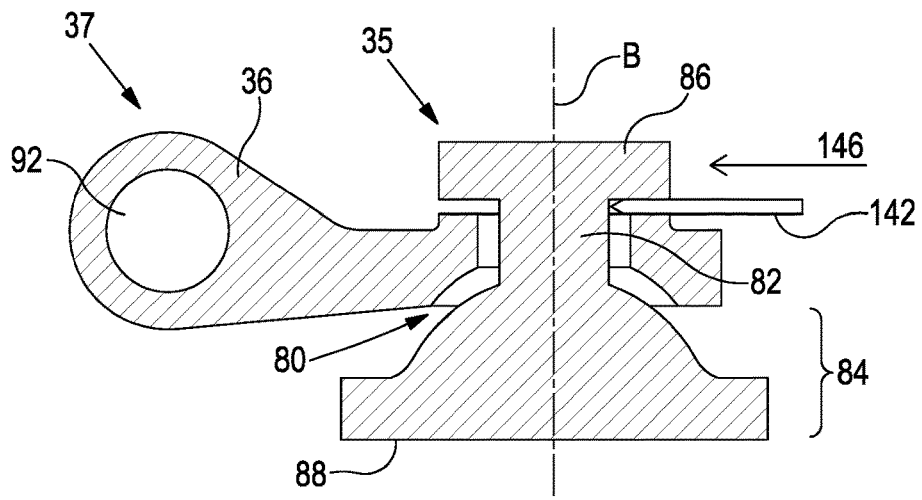
FIG. 9C shows a two-part valve member assembly formed from the one-piece manufacturing intermediate and cutting tool shown in FIGS. 9A and 9B.

The cutting tool 142 is forced into the manufacturing intermediate 140 such that it starts to cut a groove 148 in the manufacturing intermediate 140 (see FIG. 9B). The cutting tool 142 cuts into the manufacturing intermediate 140 until the valve member 35 and the support member 36 are separated, forming the two-part wastegate valve member assembly 37 (see FIG. 9C) with the valve member 35 held captive by the support member 36.

It will be appreciated that once the two-part wastegate valve member assembly 37 has been formed a clearance is provided that allows the valve member 35 to move linearly relative to the support member 36 in the direction of axis B. In particular, the valve member 35 can move relative to the support member 36 between a first end position wherein the first end portion 84 of the valve member 35 is in contact with the support member 36 and a second end position wherein the second end portion 86 of the valve member 35 is in contact with the support member 36.

Figure 10:
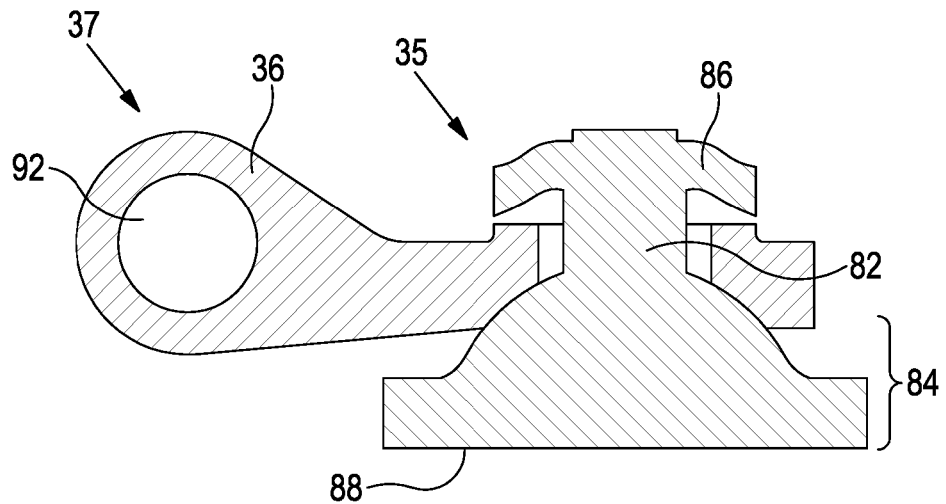
FIG. 10 shows a schematic cross sectional view of a first variant of the two-part wastegate valve member assembly shown in FIGS. 6A and 6B.

In some embodiments, after the manufacturing intermediate 140 has been separated to form the two-part wastegate valve member assembly 37, the second end portion 86 of the valve member 35 may be deformed so as to reduce this clearance. That is, as shown in FIG. 10, the second end portion 86 of the valve member 35 may be deformed so as reduce the extent of the movement of the valve member 35 that is possible relative to the support member 36. The deformation may be achieved, for example, using a hydraulic press.

Figure 11:
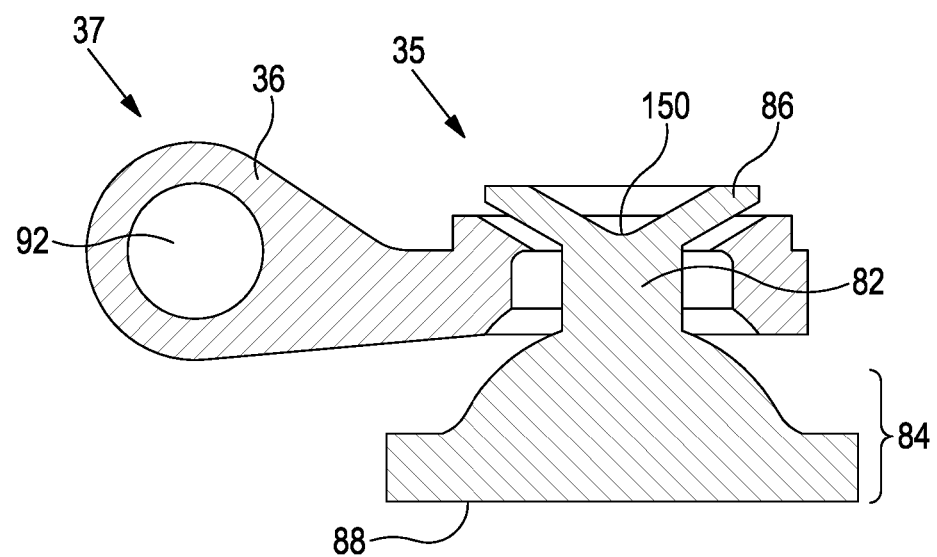
FIG. 11 shows a schematic cross sectional view of a second variant of the two-part wastegate valve member assembly shown in FIGS. 6A and 6B.

As shown in FIGS. 11 to 12D, in some embodiments a depression 150 may be provided on a surface of the second end portion 86 of the valve member 35, which may aid the deformation the second end portion 86 of the valve member 35.

As also shown in FIG. 11, in some embodiments the cut that is made in the manufacturing intermediate in order to separate the valve member 35 from the support member 36 is not perpendicular to the axis B. It will be appreciated that such a cut may be achieved in a similar way to the process described above with reference to FIGS. 9A to 9C. However, the cutting tool 142 is moved linearly in a direction which is not perpendicular to the axis B about which the manufacturing intermediate 140 is rotated. As can be seen in FIG. 11, this can result in the second end portion 86 of the valve member 35 being generally conical in shape. In combination with the depression 150 this can ensure that, in cross section, the second end portion 86 of the valve member 35 has a generally uniform material thickness. This encourages the material to deform under pressure (for example, using a hydraulic press) at intersection between the second end portion 86 and the central portion 82 of the valve member 35. The depression 150 removes some supporting material of the generally conical second end portion 86 of the valve member 35 to aid its deformation. It will be appreciated that the depression 150 may result from the casting process or, alternatively, may be subsequently removed by machining.

As shown in FIGS. 12A-12D, in some embodiments, in addition to a depression 150, the second end portion 86 of the valve member 35 may be provided with one or more cut away portions 152, which may aid the deformation of the second end portion 86 of the valve member 35. It will be appreciated that as used in this context, the term "cut away portion" is intended to mean a void or absence of the material from which the valve member 35 is formed. It will be further appreciated that such cut away portion features may result from the casting process or, alternatively, may be subsequently removed by machining. This is now discussed with reference to an embodiment shown in FIGS. 12A-12D.

As shown in FIGS. 12A-12D, in this embodiment, the two-part wastegate valve member assembly 37 is generally of the same form as the two-part wastegate valve member assembly 37 shown in FIG. 11 except that the generally hollow conical second end portion 86 of the valve member 35 is provided with three cut away portions 152 to aid its deformation. As with the embodiment shown in FIG. 11, the second end portion 86 of the valve member 35 is generally of the form of a hollow cone formed from a wall having a generally uniform material thickness. Each of the cut away portions 152 is of the form of an elongate aperture or slit that extends from an upper surface of the second end portion 86 of the valve member 35 towards the central portion 82 of the valve member 35. As can be seen in FIGS. 12C and 12D, these cut away portions 152, in combination with the depression 150, allow the generally conical second end portion 86 of the valve member 35 to be deformed such that it is generally planar. As can be seen from FIG. 12D, after deformation of the valve member 35, the second end portion 86 of the valve member 35 is generally of the form of a disc and the cut away portions 152 are generally of the form of triangular recesses that extend from a perimeter of the disc towards a centre of the disc.

Optionally, in some embodiments vibration may be used to deburr the wastegate valve member assembly 37. In particular, such vibration may be used to improve the surface finish of the interfaces between the first end portion 84 of the valve member 35 and the support member 36.

The above described two-part valve member assembly 37 and the above-described method for forming the two-part valve member assembly 37 are advantageous for a number of reasons, as now discussed.

First, it is beneficial that each of the two parts of the two-part valve member assembly 37 is formed from a single integral piece.

The wastegate valve member assembly 37 is formed as a two-part assembly, which, as described above, is beneficial since it allows the valve member 35 to rotate relative to the support member 36, allowing the valve member 35 to wear more evenly during use. However, although formed as a two part assembly (with the valve member 35 held captive by the support member 36), each of the two parts of the two-part valve member assembly 37 is formed from a single integral piece. In particular, the valve member 35 is formed as a single piece with the central portion 82 and two opposed end portions 84, 86 of the valve member 35 being integrally formed. This is in contrast to prior art arrangements wherein, typically, the valve member would be formed from a plurality of assembled parts. For example, prior art valve members (which have an analogous role to valve member 35) are typically formed from: a part that contacts the valve seat 38 (which is equivalent to the first end portion 84 of the valve member 35); a valve pin (that extends through aperture 80 and is equivalent to the central portion 82); one or more spacers; and a washer (which is equivalent to the second end portion 86 of the valve member 35). Assembly of these parts is required followed by a joining process which may involve, for example, riveting or welding to form the valve member.

In contrast to such prior art arrangements, the valve member 35 is formed from a single unitary piece that is integrally formed. Advantageously, this removes the need for an assembly step. In addition, the investment casting process can be more accurate than the assembly of component parts such that the valve member 35 can better meet desired tolerances. Furthermore, the single unitary valve member 35 is more durable and less prone to mechanical failure. In addition, the unitary valve member 35 can be shaped such that mechanical stresses in the valve member 35 can be decreased. Better durability is especially beneficial in light of the harsh conditions that the valve member assembly 37 will typically experience during use (extreme operating temperatures and pressures that can vary extensively under a range of working and non-working conditions), when the two-part valve assembly 37 forms part of a turbocharger 30.

In the above described embodiments of two-part valve member assemblies 37, complementary surfaces are formed on: (a) the first end portion 84 of the valve member 35; and (b) a portion of the support member 36 surrounding the aperture 80 which is arranged to contact the first end portion 84. In particular, referring again to FIGS. 6A and 6B, the first end portion 84 of the valve member 35 is provided with a generally convex surface (which may, for example, be generally spherical). In addition, a portion of the support member 36 surrounding the aperture 80 which is arranged to contact the first end portion 84 is provided with a generally concave surface (which may, for example, be generally spherical). These two complementary surfaces provide a centring effect for the valve member 35. This can increase the sealing ability of the wastegate valve.

In addition, as a result of this centring effect, a radial clearance between the central portion 82 of the valve member 35 and the aperture 80 in the support member 36 can be increased relative to prior art arrangements. Advantageously, this provides a larger radial gap between the two separate temporary patterns 120, 128 in which the investment materials can be received (in step 106). In addition, this increased radial clearance between the central portion 82 of the valve member 35 and the aperture 80 in the support member 36 provides an increased volume for the cutting tool 142 to break through into (see FIG. 9C). For these reasons the combination of the provision of the pair of generally complementary curved surfaces (on the first end portion 84 and a portion of the support member 36 which is arranged to contact the first end portion 84) may be considered to have a synergistic effect in combination with the above described method.

It is to be appreciated that numerous modifications to the above-described embodiments may be made without departing from the scope of the disclosure as defined in the appended claims.

Although the previous description is related to an embodiment of a two-part wastegate valve member assembly according to the present disclosure which forms part of a turbocharger, it will be appreciated that a two-part wastegate valve member assembly according to the present disclosure may form part of any appropriate turbomachine. For example, a two-part wastegate valve member assembly according to the present disclosure may form part of a turbomachine which does not include a compressor. In particular, a two-part wastegate valve member assembly according to the present disclosure may form part of a power turbine, for example a power turbine which converts the rotation of a turbine wheel into electrical power.

The two-part wastegate valve member assembly within the above described embodiment is actuated such that substantially linear movement of an actuator is converted by a linkage to rotation of an actuation member which results in movement of the valve member of the wastegate valve between open and closed positions. It will be appreciated that any appropriate configuration of actuation of the wastegate valve may be used provided it is capable of effecting a change of state of the wastegate valve between the open and closed states.

What is claimed is:

1. A method for forming a two-part wastegate valve member assembly, the method comprising:
    casting a single manufacturing intermediate;
    processing the manufacturing intermediate so as to form a two-part assembly, the two-part assembly comprising a support member and a valve member, wherein the support member defines an aperture and wherein the valve member comprises a central portion extending through the aperture and two opposed end portions disposed on opposite sides of the aperture and at opposing ends of the central portion, each of the two end portions having dimensions greater than corresponding dimensions of the central portion or the aperture such that the valve member is held captive by the support member; and
    after the manufacturing intermediate has been processed to form the two-part wastegate valve member assembly, deforming the valve member so as to reduce the extent of the movement of the valve member that is possible relative to the support member.

2. The method of claim 1 wherein the casting of the single manufacturing intermediate is achieved using investment casting.

3. The method of claim 1 wherein casting the single manufacturing intermediate includes:
    forming first and second temporary patterns, each of the first and second temporary patterns corresponding to a different portion of the manufacturing intermediate, wherein the first temporary pattern comprises a portion that corresponds to a portion of the manufacturing intermediate from which part of the valve member will be formed and the second temporary pattern comprises a portion that corresponds to a portion of the manufacturing intermediate from which a second part of the valve member will be formed;
    joining the temporary patterns together to form an assembled pattern cluster;
    applying investment materials to the assembled pattern cluster to form an investment mould; and casting the single manufacturing intermediate in the investment mould.

4. The method of claim 1 wherein processing the manufacturing intermediate so as to form a two-part assembly comprises:
using a cutting mechanism for removing material from the manufacturing intermediate while moving the manufacturing intermediate relative to the cutting mechanism.

5. The method of claim 4 wherein using a cutting mechanism for removing material from the manufacturing intermediate while moving the manufacturing intermediate relative to the cutting mechanism comprises rotating the single manufacturing intermediate about an axis while the cutting mechanism cuts generally linearly into the manufacturing intermediate.

6. The method of claim 1 wherein during the casting and/or processing of the single manufacturing intermediate, the valve member is provided with one or more features to aid the deformation of the valve member.

7. The method of claim 1 further comprising vibration of the two-part valve assembly to deburr the two-part wastegate valve member assembly.

8. The method of claim 1 wherein complementary curved surfaces are formed on: a first end portion of the valve member; and a portion of the support member surrounding the aperture which is arranged to contact the first end portion.

9. A method for forming a two-part wastegate valve member assembly, the method comprising:
casting a single manufacturing intermediate; and
processing the manufacturing intermediate so as to form a two-part assembly, the two-part assembly comprising a support member and a valve member, wherein the support member defines an aperture and wherein the valve member comprises a central portion extending through the aperture and two opposed end portions disposed on opposite sides of the aperture each of the two end portions having dimensions such that the valve member is held captive by the support member,
wherein the casting the single manufacturing intermediate includes casting the single manufacturing intermediate using at least one of:
an investment casting and
a process including:
forming first and second temporary patterns, each of the first and second temporary patterns corresponding to a different portion of the manufacturing intermediate, wherein the first temporary pattern comprises a portion that corresponds to a portion of the manufacturing intermediate from which part of the valve member will be formed and the second temporary pattern comprises a portion that corresponds to a portion of the manufacturing intermediate from which a second part of the valve member will be formed;
joining the temporary patterns together to form an assembled pattern cluster;
applying investment materials to the assembled pattern cluster to form an investment mould; and
casting the single manufacturing intermediate in the investment mould.

10. A turbine comprising:
a turbine housing defining a turbine inlet upstream of a turbine wheel and a turbine outlet downstream of the turbine wheel;
a wastegate passage connecting the turbine inlet and the turbine outlet; and
a wastegate valve comprising a two-part wastegate valve member assembly made by the process according to claim 9.

11. A turbocharger or powerturbine including a turbine according to claim 10.

12. A method for forming a two-part wastegate valve member assembly, the method comprising:
casting a single manufacturing intermediate; and
processing the manufacturing intermediate so as to form a two-part assembly, the two-part assembly comprising a support member and a valve member, wherein the support member defines an aperture and wherein the valve member comprises a central portion extending through the aperture and two opposed end portions disposed on opposite sides of the aperture each of the two end portions having dimensions such that the valve member is held captive by the support member,
wherein at least one of
processing the manufacturing intermediate so as to form a two-part assembly comprises using a cutting mechanism for removing material from the manufacturing intermediate while moving the manufacturing intermediate relative to the cutting mechanism and
after the manufacturing intermediate has been processed to form the two-part wastegate valve member assembly, the valve member is deformed so as to reduce the extent of the movement of the valve member that is possible relative to the support member.

13. The method of claim 12 wherein using a cutting mechanism for removing material from the manufacturing intermediate while moving the manufacturing intermediate relative to the cutting mechanism comprises rotating the single manufacturing intermediate about an axis while the cutting mechanism cuts generally linearly into the manufacturing intermediate.

14. The method of claim 12 wherein during the casting and/or processing of the single manufacturing intermediate, the valve member is provided with one or more features to aid the deformation of the valve member.

15. A turbine comprising:
a turbine housing defining a turbine inlet upstream of a turbine wheel and a turbine outlet downstream of the turbine wheel;
a wastegate passage connecting the turbine inlet and the turbine outlet; and
a wastegate valve comprising a two-part wastegate valve member assembly made by the process according to claim 12.

16. A turbocharger or powerturbine including a turbine according to claim 15.

* * * * *